United States Patent
Matiash et al.

(10) Patent No.: US 9,102,000 B2
(45) Date of Patent: Aug. 11, 2015

(54) PUSHBUTTON WIRE GUIDE HOLDER FOR A WELDING WIRE FEEDER

(75) Inventors: Nicholas Alexander Matiash, Oshkosh, WI (US); Mark R. Christopher, Neenah, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 747 days.

(21) Appl. No.: 13/314,997

(22) Filed: Dec. 8, 2011

(65) Prior Publication Data

US 2012/0152926 A1 Jun. 21, 2012

Related U.S. Application Data

(60) Provisional application No. 61/423,831, filed on Dec. 16, 2010.

(51) Int. Cl.
| | | |
|---|---|---|
| *B23K 9/12* | (2006.01) |
| *B23K 9/28* | (2006.01) |
| *B23K 9/133* | (2006.01) |
| *B23K 9/32* | (2006.01) |
| *B65H 51/10* | (2006.01) |
| *B65H 57/12* | (2006.01) |

(52) U.S. Cl.
CPC .............. *B23K 9/1336* (2013.01); *B23K 9/32* (2013.01); *B65H 51/10* (2013.01); *B65H 57/12* (2013.01)

(58) Field of Classification Search
CPC ............... B23K 37/02–37/0538; B23K 9/1336
USPC ................................................ 219/136–144
See application file for complete search history.

(56) References Cited

U.S. PATENT DOCUMENTS

| | | | |
|---|---|---|---|
| 3,529,127 A * | 9/1970 | Smith ...................... 219/137.31 |
| 3,675,837 A | 7/1972 | Gerould |
| 4,172,545 A | 10/1979 | Jones et al. |
| 4,688,709 A * | 8/1987 | Minor ........................... 226/128 |
| 5,839,642 A * | 11/1998 | Tait ................................ 228/41 |
| 6,030,349 A | 2/2000 | Wilson et al. |
| 7,208,699 B2 * | 4/2007 | Stanzel ................... 219/137.63 |
| 2002/0026202 A1 * | 2/2002 | Honey et al. .................. 606/127 |
| 2007/0108172 A1 | 5/2007 | Belfiore et al. |

FOREIGN PATENT DOCUMENTS

JP 2004041550 A 2/2004

OTHER PUBLICATIONS

International Search Report & Written Opinion of PCT/US2011/064691 mailed Apr. 23, 2012.

* cited by examiner

*Primary Examiner* — Sang Y Paik
(74) *Attorney, Agent, or Firm* — Fletcher Yoder P.C.

(57) ABSTRACT

Embodiments of a welding wire feeder including a pushbutton wire guide holder are provided. The wire guide holder may allow for the insertion and removal of a welding wire guide by depression of a spring-biased pushbutton and hold the wire guide with force applied by a spring. The pushbutton is disposed in a body, and a stop placed in contact with the pushbutton may prevent the pushbutton from being forced out of the body by the spring force. Some embodiments are directed toward holding inlet wire guides or intermediate wire guides, and therefore include different configurations of the body, pushbutton, spring, and stop.

20 Claims, 6 Drawing Sheets

PUSHBUTTON WIRE GUIDE HOLDER FOR A WELDING WIRE FEEDER

CROSS REFERENCE TO RELATED APPLICATIONS

This application is a Non-Provisional patent application of U.S. Provisional Patent Application No. 61/423,831, entitled "Push Button Quick Change Guide", filed Dec. 16, 2010, which is herein incorporated by reference.

BACKGROUND

The invention relates generally to welding systems, and, more particularly, to a pushbutton wire guide holder for use in a welding wire feeder.

Welding is a process that has increasingly become ubiquitous in various industries and applications. While such processes may be automated in certain contexts, a large number of applications continue to exist for manual welding operations. Such welding operations rely on a variety of types of equipment to ensure the supply of welding consumables (e.g., wire feed, shielding gas, etc.) is provided to the weld in an appropriate amount at the desired time. For example, metal inert gas (MIG) welding typically relies on a wire feeder to ensure a proper wire feed reaches a welding torch.

Wire feeders facilitate the feeding of welding wire from a wire spool, through one or two pairs of feed rolls, to the welding torch at a desired wire feed rate. Wire is guided from the spool to the feed rolls by an inlet wire guide fixed adjacent to the feed rolls to align the wire as it moves through the wire feeder. Wire feeders that include two pairs of feed rolls also feature an intermediate wire guide, fixed between the two pairs of feed rolls to ensure alignment of the welding wire as it is moved between the pairs of feed rolls. Both inlet and intermediate wire guides are consumables that typically wear out and may be replaced after a certain amount of use.

Wire guides are coupled to a support structure in the wire feeder and are typically tightened into place with a thumb screw or a bolt, which may require a special tool for insertion and removal. Occasionally, the thumb screw may be tightened too tight when a wire guide is replaced, crushing the wire guide such that the guide may no longer align welding wire with the subsequent pair of feed rolls. In addition, a crushed wire guide may be plastically deformed in a way that prevents removal of the wire guide from the support structure of the wire feeder. In other instances when a new wire guide is being attached, the thumb screw or bolt may not be tightened enough, allowing the wire guide to vibrate out of alignment with the feed rolls as the wire feeder is used. Accordingly, there exists a need for a welding wire feeder that overcomes these drawbacks.

BRIEF DESCRIPTION

In an exemplary embodiment, a welding wire feeder includes a body configured to hold a welding wire guide. The welding wire feeder also includes a pushbutton disposed in the body with a recess through which a welding wire guide may be received. The pushbutton, when pressed by a user, allows for the insertion and removal of the wire guide. A spring exerts a restoring force on the pushbutton, urging the pushbutton away from a depressed position, and a stop prevents the pushbutton from being forced out of the body by the spring.

In another embodiment, a welding wire feeder features a wire drive assembly used to drive wire from a spool to a welding gun. The welding wire feeder also features a pushbutton wire guide holder assembled to allow for insertion and removal of a wire guide and to hold the wire guide in place with force from a spring. The wire guide aligns welding wire coming off a spool in the welding wire feeder with the wire drive assembly.

In a further embodiment, a welding wire feeder includes a pushbutton wire guide holder featuring a spring-biased pushbutton assembly. The pushbutton wire guide holder allows for the insertion and removal of a wire guide by the depression of a pushbutton and holds the inserted wire guide in place with a spring force.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
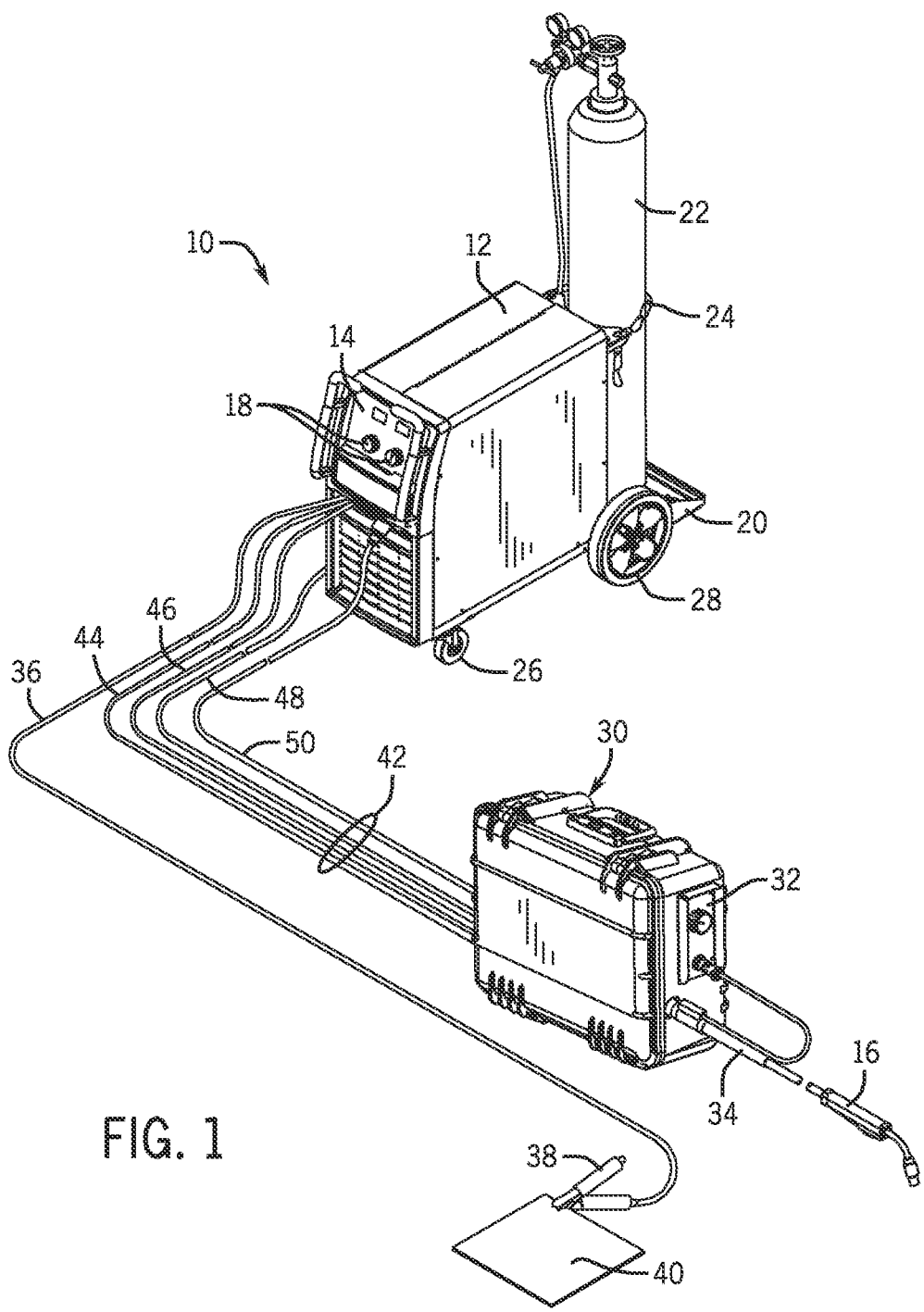
FIG. 1 is a perspective view of an exemplary welding power supply coupled to a wire feeder in accordance with present techniques.

Turning now to the drawings, FIG. 1 illustrates an exemplary welding system 10 which powers, controls, and provides supplies to a welding operation. The welding system 10 includes a welder 12 having a control panel 14 through which a welding operator may control the supply of welding materials, such as gas flow, wire feed, and so forth, to a welding gun 16. To that end, the control panel 14 includes input or interface devices, such as control inputs 18 that the operator may use to adjust welding parameters (e.g., voltage, current, etc.). The welder 12 may also include a tray 20 mounted on a back of the welder 12 and configured to support a gas cylinder 22 held in place with a chain 24. The gas cylinder 22 is the source of the gas that supplies the welding gun 16. Furthermore, the welder 12 may be portable via a set of smaller front wheels 26 and a set of larger back wheels 28, which enable the operator to move the welder 12 to the location of the weld. It should be noted, however, that the present wire guide techniques may be used with any suitable type of welding system, typically MIG systems utilizing solid, flux cored or metal core wires fed by a wire feeder as described below. Moreover, the techniques may be used with both manual and automated welding systems.

The welding system 10 also includes a wire feeder 30 that provides welding wire to the welding gun 16 for use in the welding operation. The wire feeder 30 may include a control panel 32 that allows the user to set one or more wire feed parameters, such as wire feed speed. In presently contemplated embodiments, the wire feeder 30 houses a variety of internal components, including those described herein.

A variety of cables couple the components of the welding system 10 together and facilitate the supply of welding materials to the welding gun 16. A first cable 34 couples the welding gun 16 to the wire feeder 30. A second cable 36 couples the welder 12 to a work clamp 38 that connects to a workpiece 40 to complete the circuit between the welder 12 and the welding gun 16 during a welding operation. A bundle 42 of cables couples the welder 12 to the wire feeder 30 and provides weld materials for use in the welding operation. The bundle 42 includes a feeder power lead 44, a weld cable 46, a gas hose 48, and a control cable 50. Depending on the polarity of the welding process, the feeder power lead 44 connects to the same weld terminal as the cable 36. It should be noted that the bundle 42 of cables may not be bundled together in some embodiments. Conversely, in some systems some reduction in wiring may be realized, such as by communicating control and feedback signals over the welding power cable.

It should be noted that although the illustrated embodiments are described in the context of a constant voltage MIG welding process, the features of the invention may be utilized with a variety of other suitable welding systems and processes that utilize continuously fed wires.

Figure 2:
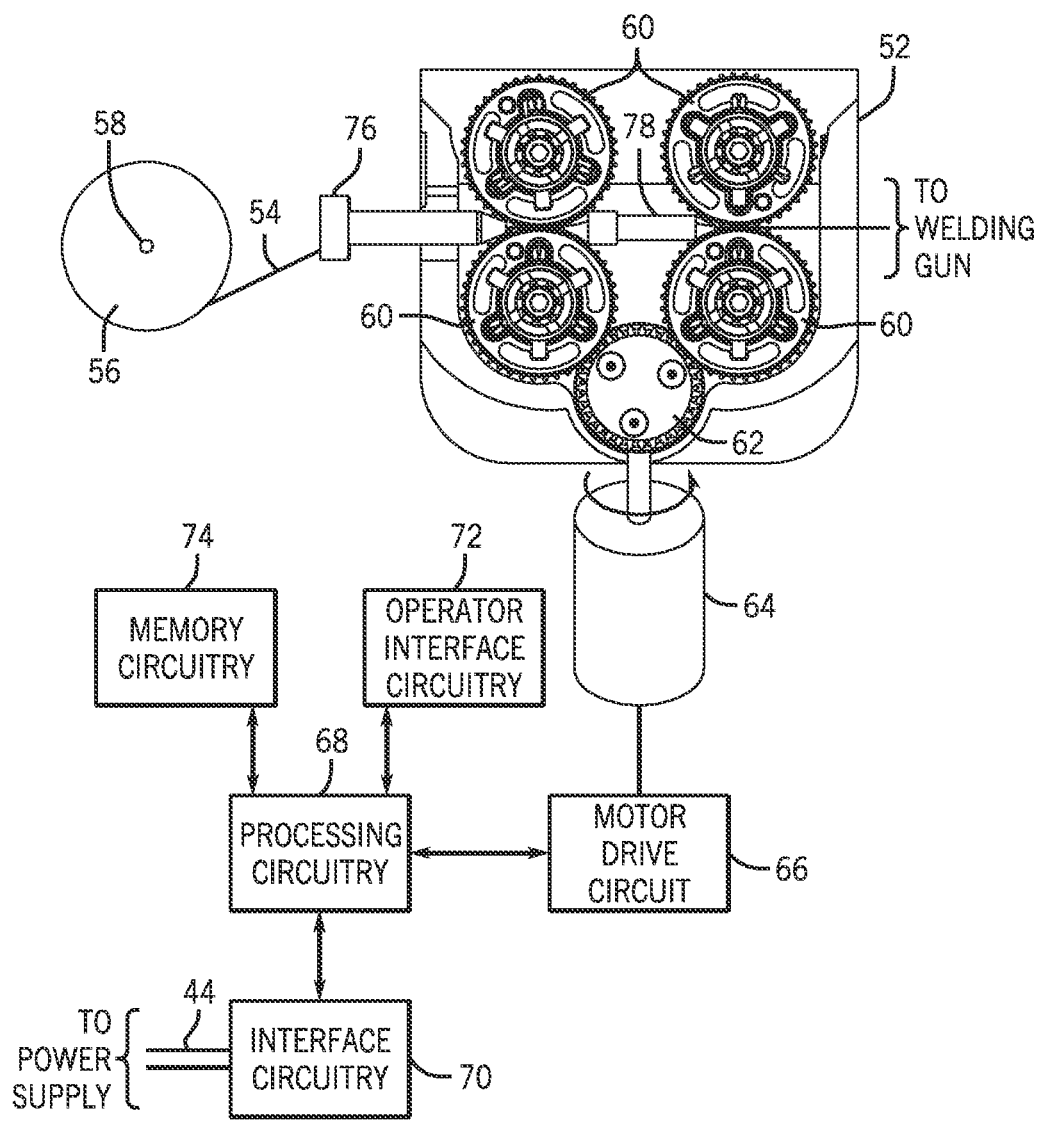
FIG. 2 is a schematic representation of certain components of the wire feeder of FIG. 1.

FIG. 2 schematically illustrates certain internal components of the wire feeder 30. This particular wire feeder 30 utilizes a four-roll wire drive assembly 52 to drive welding wire 54 from a spool 56, mounted on a spool mount 58, to the welding gun 16. Four-roll wire drive assemblies are typically featured in wire feeders used to supply welding wire 54 for heavy-duty welding applications in factory settings. This type of wire drive assembly includes two pairs of feed rolls 60, each pair having one feed roll 60 coupled to a gear 62, which is turned by a motor drive 64 in order to feed the wire 54 to the welding gun 16 at an appropriate rate. This rate may vary based on the type of welding operation being performed and the size and type of welding wire 54 used.

A motor drive circuit 66 turns the motor drive 64 at a desired rate for feeding the wire 54, the rate being determined by and communicated to the motor drive circuit 66 by processing circuitry 68. Power is conveyed through the feeder power lead 44 to interface circuitry 70, which supplies this power to the processing circuitry 68. Operator interface circuitry 72 communicates the desired wire feed parameters, selected on the control panel 32 by a user, to the processing circuitry 68. Also coupled to the processing circuitry 68 is memory circuitry 74, allowing for certain wire feed parameters to be stored and later referenced by the processing circuitry 68.

The wire 54 is aligned and directed into a slot between the first pair of feed rolls 60 by an inlet wire guide 76. The inlet wire guide 76 redirects the wire 54 from the angle it exits the spool 56 to an angle tangent to the feed rolls 60. The wire feeder of FIG. 2 also includes an intermediate wire guide 78 for aligning the wire 54 between the two pairs of feed rolls. Inlet wire guides are generally made from brass, hardened steel, or plated steel, and intermediate wire guides are generally made from brass. When used to guide aluminum welding wire, though, plastic (e.g., nylon) wire guides may be used.

Both inlet and intermediate wire guides are consumables, requiring replacement for a number of reasons. For example, a wire guide may become worn through frictional contact with a wire, a wire may cut a slot along an inside edge of the wire guide, or a different guide may be necessary for directing welding wire of a different size or material.

Figure 3:
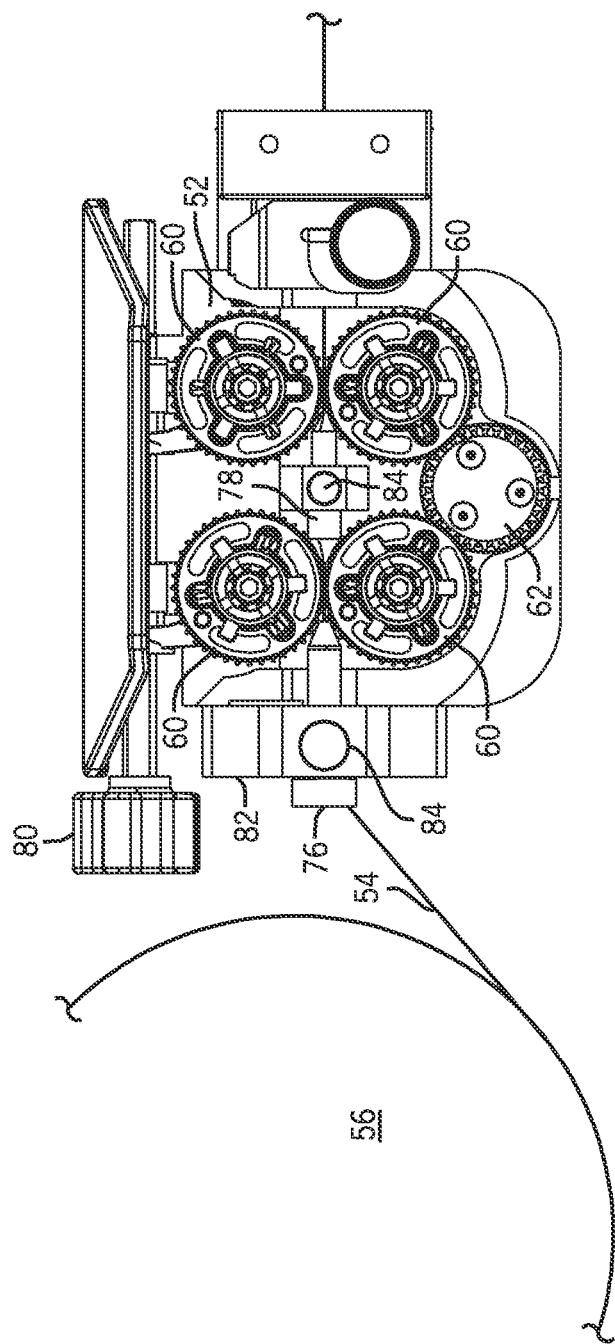
FIG. 3 is a front view of certain of the internal mechanical components of the wire feeder of FIG. 2.

FIG. 3 illustrates certain of the internal mechanical components of the wire feeder 30. The wire drive assembly 52 of the wire feeder 30 includes the two pairs of feed rolls 60, as well as the driving gear 62. The wire 54 is driven from the spool 56 to the feed rolls 60, and a pressure adjustment knob 80 is used to raise or lower the upper feed rolls in order to accommodate different sizes and types of welding wire. The inlet wire guide 76 is positioned in a body 82 that is coupled to the wire drive assembly 52, while the intermediate wire guide 78 is positioned in the wire drive assembly 52 itself. The inlet wire guide 76 and the intermediate wire guide 78 are each secured into alignment with the feed rolls 60 with a pushbutton wire guide holder 84.

Figure 4:
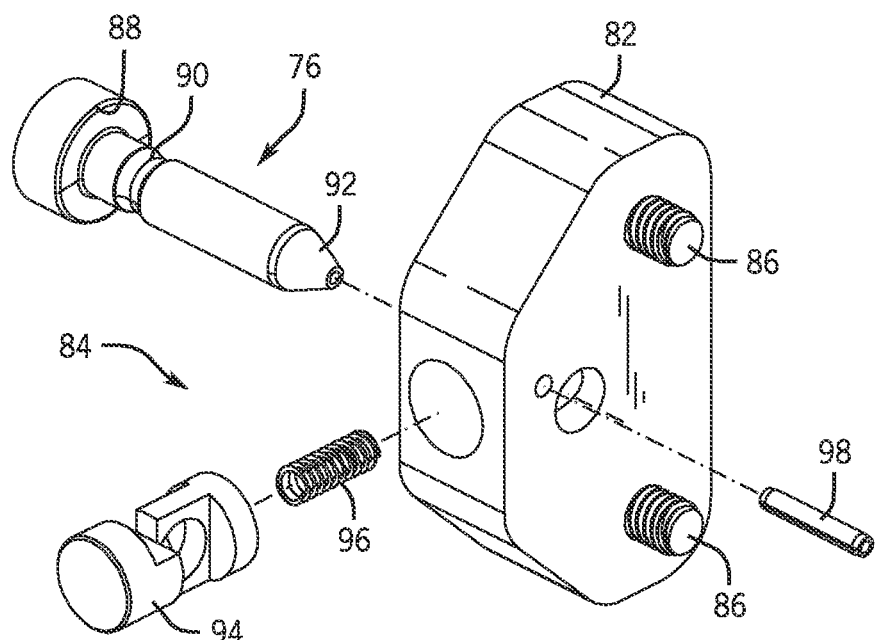
FIG. 4 is an exploded perspective view of an exemplary configuration of a pushbutton wire guide holder used to hold an inlet wire guide.

An exploded perspective view of an exemplary configuration of the pushbutton wire guide holder 84 is shown in FIG. 4. This configuration is used to secure an inlet wire guide 76 into the body 82, which is coupled to the wire drive assembly 52 with two bolts 86. The inlet wire guide 76 conforms to an industry standard, and consequently, this configuration of the pushbutton wire guide holder 84 is compatible with inlet guides currently used in wire feeders. The inlet guide 78 features a shoulder 88 configured to abut the body 82 so that the inlet wire guide 76 is not pulled by the wire 54 into the feed rolls 60. In addition, the inlet wire guide 78 comprises a groove 90 around its circumference and a tapered end 92 which further directs the wire 54 into precise alignment with the feed rolls 60.

Figure 5:
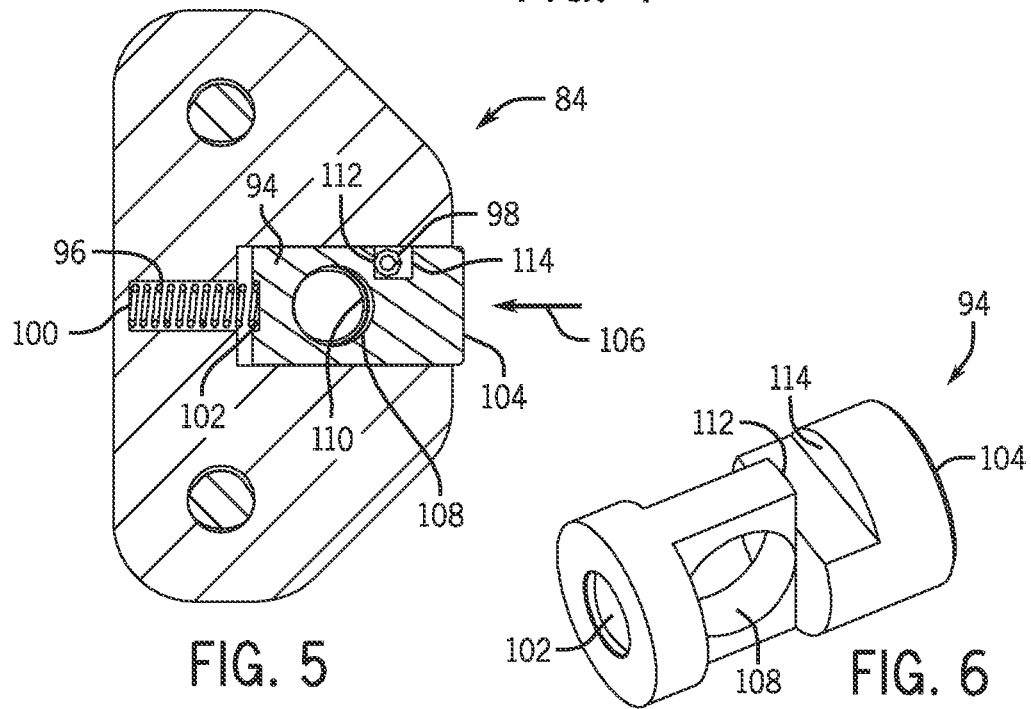
FIG. 5 is a left side cross section of the pushbutton wire guide holder of FIG. 4.

The pushbutton wire guide holder 84 comprises a pushbutton 94 and spring 96, disposed adjacent to each other in the body 82. A roll pin 98 is also disposed in the body 82, parallel to the inlet wire guide 76 and perpendicular to the pushbutton 94 and the spring 96. A left side sectional view of these components of the pushbutton wire guide holder 84 is illustrated in FIG. 5. The spring 96 is disposed between an abutment surface 100 of the body 82 and a spring contact surface 102 of the pushbutton 94. The pushbutton 94 features a pushbutton surface 104 extending out of the body 82, and when pressed, as indicated by an arrow 106, an aperture 108 formed through the pushbutton 94 may be aligned with a channel 110 through the body 82.

The aperture 108 and the channel 110 may be approximately equal in diameter and slightly larger in diameter than the inlet wire guide 76, allowing for the capture of the inlet wire guide 76. For example, an inlet wire guide with a diameter of 0.375 inches may be captured by a pushbutton inlet guide holder with an aperture diameter within a range of approximately 0.385 inches to 0.390 inches. If the diameter of the inlet wire guide 76 is known, the location of the channel 110 within the body 82 may be determined such that the center of the inlet wire guide 76 aligns closely to the slot between the feed rolls 60 through which the wire 54 is driven. Therefore, the inlet wire guide 76 may be aligned more precisely than would be possible if it were screwed into place with a thumb screw or bolt.

Once the inlet wire guide 76 is inserted into the aperture 108 and the channel 110, the pressing force may be removed from the pushbutton surface 104, allowing the spring 96 to exert a restoring force on the pushbutton 94. This force on the pushbutton 94 may capture the inlet wire guide 76 between an edge of the aperture 108 and an edge of the channel 110. The spring 96 may be configured with a known spring constant such that the force applied to depress the spring 96, and the restoring force of the spring 96, may not reach a level that would plastically deform the inlet guide 78.

The roll pin 98 is shown resting in a rectangular cross section formed between the pushbutton 94 and the body 82, the pushbutton 94 contacting the roll pin 98 at a first stop surface 112. The roll pin 98 forms is a stop configured to prevent escape of the pushbutton 94 from the body 82. In addition, the roll pin 94 stops the pushbutton 94 from rotating about its axis. Such rotation could lead to misalignment of the aperture 108 with the edge of the channel 110 through the body 82. A second stop surface 114 of the pushbutton 94 prevents the pushbutton 94 from being forced too far into the body 82, where the aperture 108 could potentially damage the inlet wire guide 76.

Figure 6:
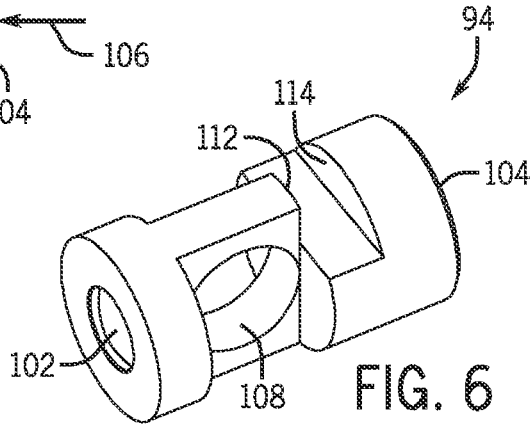
FIG. 6 is a perspective view of the pushbutton of FIG. 4.

FIG. 6 is a detailed illustration of the configuration of the pushbutton 94 of the previous two figures. The spring contact surface 102 is shown to be a circular recess in the end of the pushbutton 94 opposite the pushbutton surface 104. Coupling the spring 96 to a recess in the pushbutton 94 may prevent the spring 96 from shifting out of alignment with the pushbutton 94 while disposed between the body 82 and the pushbutton 94. The aperture 108 is formed through a section of the pushbutton 94 approximately wide enough to fit into the groove 90 in the inlet wire guide 76. Capturing the inlet wire guide 76 at this groove 90 may halt movement of the inlet wire guide 76 in the direction of its axis, so the inlet wire guide 76 may not be pulled by the wire 54 toward the feed rolls 60.

Figure 7:
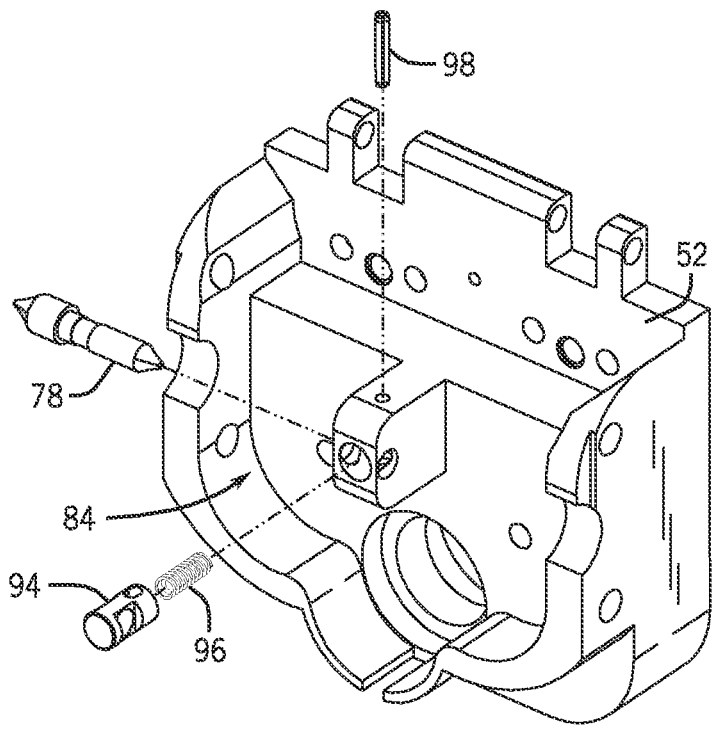
FIG. 7 is an exploded perspective view of a second configuration of the pushbutton wire guide holder used to hold an intermediate wire guide.

FIG. 7 illustrates a second configuration of the pushbutton wire guide holder 84, used for insertion, removal, and capture of the intermediate wire guide 78. This configuration of the pushbutton wire guide holder 84 includes all the features of the first configuration, specifically the pushbutton 94, the spring 96, and the roll pin 98. However, instead of being disposed within a body 82 attached to the wire drive assembly 52, these components are shown disposed in the wire drive assembly 52 itself. Other embodiments could feature a separate body attached to the wire drive assembly 52 to hold the intermediate wire guide 78, like the body 82 used to hold the inlet wire guide 76 in the previous pushbutton configuration. It should be noted that, due to the placement of the intermediate wire guide 78 between the feed rolls 60, the roll pin is vertically disposed in the wire drive assembly 52, perpendicular to both the intermediate wire guide 78 and the pushbutton 94.

Figure 8:
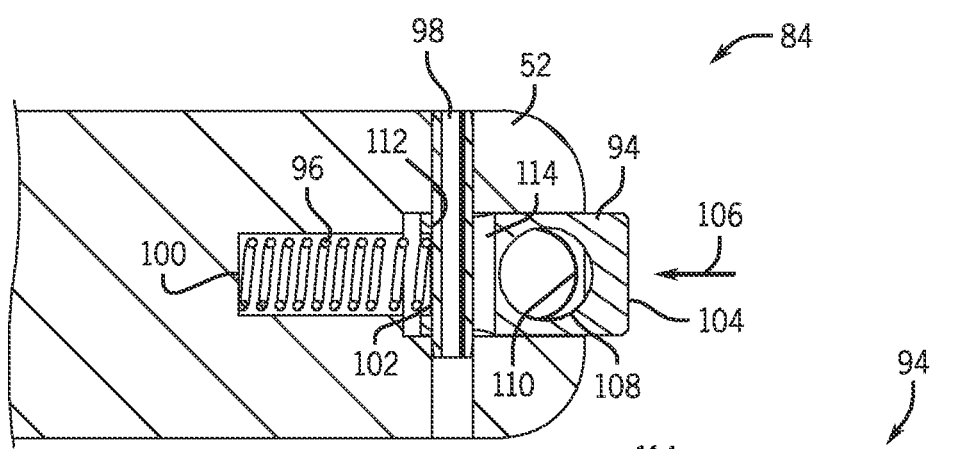
FIG. 8 is a left side cross section of the pushbutton wire guide holder of FIG. 7.

FIG. 8 is a left side cross section of the second configuration of the pushbutton wire guide holder 84. As with the first configuration of the pushbutton wire guide holder 84, the spring 96 contacts an abutment surface 100 of the wire drive assembly 52 and a spring contact surface 102 of the pushbutton 94. The pushbutton surface 104 is configured to be pressed in the direction indicated by the arrow 106 to align the pushbutton aperture 108 with the channel 110 in the wire drive assembly 52. Once these are aligned, the intermediate wire guide 78 may be inserted through the aperture 108 and the channel 110. The roll pin 98, disposed vertically in this configuration, is shown contacting the first stop surface 112, which prevents the pushbutton 94 from being forced out of the wire drive assembly 52 by the spring 96. The second stop surface 114 is designed to prevent a user from pushing the pushbutton 94 so far toward the spring 96 that the aperture 108 crushes the intermediate wire guide 78. It should be noted that different configurations of the various components that make up the pushbutton wire guide holder 84 may be employed, as will be apparent to those skilled in the art.

Figure 9:
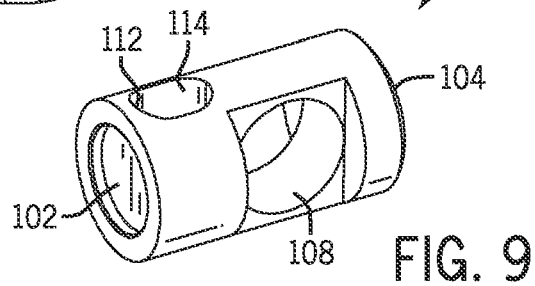
FIG. 9 is a perspective view of the pushbutton of FIG. 7.

FIG. 9 provides a detailed perspective view of the pushbutton 94 of FIG. 7, including the recess formed in the pushbutton 94 to act as the spring contact surface 102. The first stop surface 112 and second stop surface 114 both include rounded edges in this configuration, as opposed to the straight edges of the configuration in FIG. 6. It should be noted that the stop surfaces may feature rounded or straight edges when used to contact a roll pin disposed in any orientation within the structure holding the pushbutton wire guide holder 84.

Figure 10:
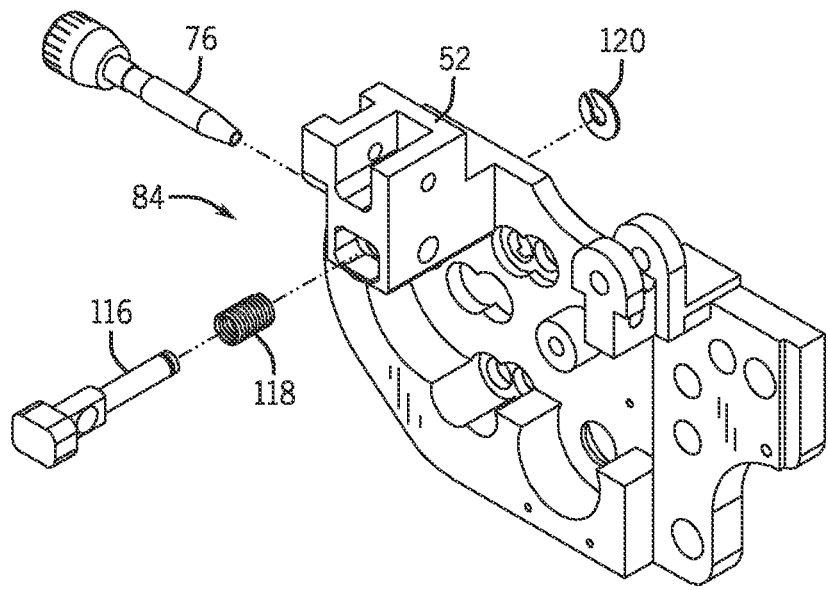
FIG. 10 is an exploded perspective view of another embodiment of a pushbutton wire guide holder used to hold an inlet wire guide.
Figure 11:
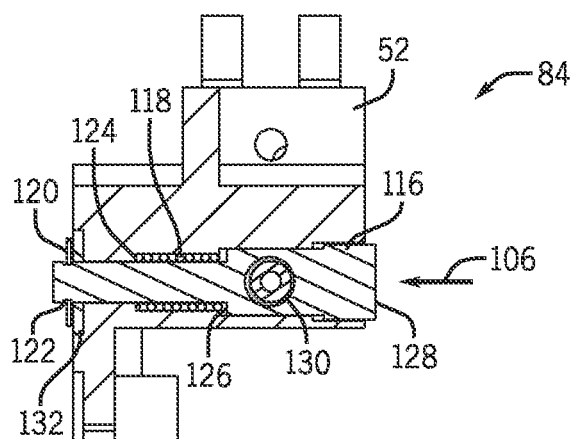
FIG. 11 is a left side cross section of the pushbutton wire guide holder of FIG. 10.
Figure 12:
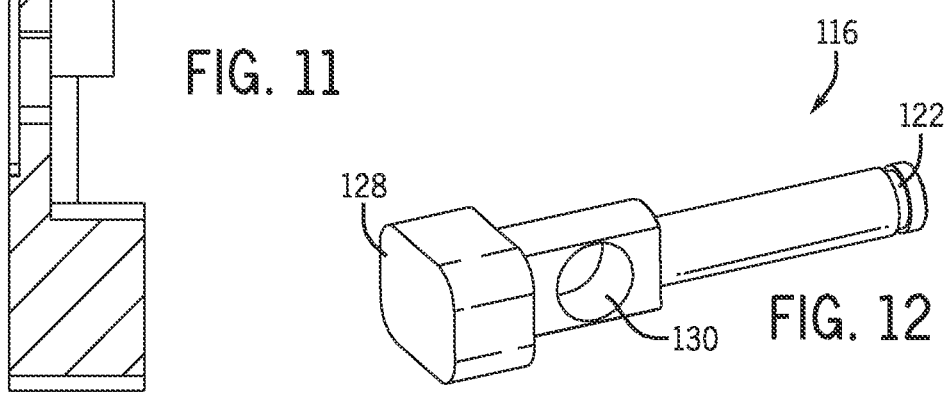
FIG. 12 is a perspective view of the pushbutton of FIG. 10.

FIG. 10 illustrates another embodiment of the pushbutton wire guide holder 84 comprising a pushbutton 116 that extends completely through a wire drive assembly 52. In this embodiment, the wire drive assembly 52 forms the body into which the pushbutton 116 is situated. The pushbutton wire guide holder 84 also features a spring 118 and a retaining ring 120. The spring 118 is large enough to fit around a length of the pushbutton 116, and the retaining ring 120 couples to the end of the pushbutton 116 that extends out the back side of the wire drive assembly 52. FIG. 11, a left side sectional view of the completed pushbutton wire guide holder 84, shows the retaining ring 120 fitting in a groove 122 formed around the end of the pushbutton 116. The spring 118 contacts an annular abutment surface 124 of the wire drive assembly 52 as well as a spring contact surface 126 of the pushbutton 116, but instead of being disposed adjacent to the pushbutton 116, the spring 118 is disposed around the pushbutton 116. The pushbutton 116 features a pushbutton surface 128 to be pressed as indicated by the arrow 106 for the insertion or removal of the inlet wire guide 76. When the pushbutton surface 128 is pressed, an aperture 130 aligns with a channel through the wire drive assembly 52, allowing the inlet guide 76 to pass through and be secured in place by a restoring force from the spring 118. The retaining ring 120 prevents the restoring force from forcing the pushbutton 116 out of the wire drive assembly 52 by contacting an annular stop surface 132 of the wire drive assembly 52. In this embodiment, the retaining ring 120 forms a stop of the pushbutton wire guide holder 84 configured to prevent escape of the pushbutton 116 from the wire drive assembly 52. In other embodiments, the stop may be a fastener such as a screw or nut configured to couple with an end of the pushbutton 116 extending from the wire drive assembly 52 in order to abut the annular stop surface 132.

A detailed view of the pushbutton 116 of the second pushbutton wire guide holder 84 embodiment is illustrated in FIG. 11. The retaining ring 120, which couples to the groove 122 in the pushbutton 116, prevents the pushbutton 116 from escaping the wire drive assembly 52, similar to the roll pin 98 in the previous embodiment. However, unlike the roll pin 98, the retaining ring 120 does not prevent the pushbutton 116 from rotating about its axis. To account for this, the pushbutton surface 128 of the pushbutton 116 may be configured in a unique geometrical shape, such as the rounded oblong shape shown in FIG. 11. This shape may prevent the pushbutton 116 from rotating about its axis so that the aperture 130 remains aligned rotationally with the channel through the wire drive assembly 52.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding device comprising:
a body configured to receive a wire guide of a wire feeding assembly wherein a welding wire passes through the welding guide during an operation of the welding device;

a pushbutton disposed in the body, the pushbutton having a recess formed therethrough for receiving and contacting the wire guide of the wire feeding assembly, and the pushbutton configured to be pushed by a user for insertion or removal of the wire guide of the wire feeding assembly;

a spring configured to urge the pushbutton towards a non-depressed position wherein the pushbutton captures the wire guide of the wire feeding assembly in the body; and a stop configured to prevent escape of the pushbutton from the body.

2. The welding device of claim 1, wherein the pushbutton comprises a contact surface configured to be pushed by a user for insertion or removal of the wire guide of the wire feeding assembly.

3. The welding device of claim 1, wherein the spring is disposed in the body, and contacts an abutment surface of the body and a spring contact surface of the pushbutton.

4. The welding device of claim 1, wherein the pushbutton comprises a stop surface, and the stop comprises a pin disposed in the body and configured to contact the stop surface of the pushbutton.

5. The welding device of claim 4, wherein the pin is disposed generally parallel to the recess.

6. The welding device of claim 4, wherein the pin is disposed generally perpendicular to the recess.

7. The welding device of claim 1, wherein the stop comprises a retaining ring disposed on the pushbutton.

8. The welding device of claim 1, wherein the recess comprises an aperture formed through the pushbutton.

9. A welding device comprising:
a wire drive assembly configured to drive welding wire from a spool towards a welding torch; and
an element holder having a spring-biased pushbutton assembly configured to permit insertion or removal of a wire guide of the wire drive assembly, and to hold the wire guide of the wire drive assembly by force applied by a spring wherein the welding wire passes through the welding guide during an operation of the welding device.

10. The welding device of claim 9, wherein the element holder is disposed in a body coupled to the wire drive assembly.

11. The welding device of claim 9, wherein the element holder is disposed in the wire drive assembly.

12. The welding device of claim 9, wherein the spring contacts a spring contact surface of the element holder and the force applied by the spring urges the element holder into contact with the element of the wire drive assembly.

13. The welding device of claim 9, wherein the pushbutton assembly comprises a stop configured to halt movement of the element holder caused by the force applied by the spring.

14. The welding device of claim 9, wherein the element holder is configured to hold the wire guide of the wire drive assembly generally perpendicular to the spring.

15. The welding device of claim 9, wherein the wire guide of the wire drive assembly is received and contacted by an aperture formed through the element holder.

16. The welding device of claim 9, wherein the element holder is configured to allow insertion or removal of the wire guide of the wire drive assembly only when the pushbutton is depressed.

17. A welding device comprising:
an element holder having a spring-biased pushbutton assembly configured to permit insertion or removal of a wire guide of a wire feeding assembly by depression of a spring-biased pushbutton, the pushbutton holding the wire guide of the wire feeding assembly by force applied by a spring wherein a welding wire passes through the welding guide during an operation of the welding device.

18. The welding device of claim 17, wherein the pushbutton is configured to receive the inserted wire guide of the wire feeding assembly into an aperture formed through the pushbutton.

19. The welding device of claim 17, wherein the spring applies force to the pushbutton at a spring contact surface of the pushbutton.

20. The welding device of claim 17, wherein the pushbutton assembly comprises a stop configured to prevent the pushbutton from being forced out of contact with the spring.

\* \* \* \* \*